US006684240B1

(12) United States Patent
Goddard

(10) Patent No.: US 6,684,240 B1
(45) Date of Patent: Jan. 27, 2004

(54) METHOD OF SETTING PARENTAL LOCK LEVELS BASED ON EXAMPLE CONTENT

(75) Inventor: Mark D. Goddard, Dallas, TX (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/464,275

(22) Filed: Dec. 15, 1999

(51) Int. Cl.[7] .............................. H04N 7/00; G06F 17/30
(52) U.S. Cl. ............................ 709/217; 709/203; 707/5; 707/9; 725/28
(58) Field of Search ......................... 709/203, 217–229; 725/104, 10, 12, 30, 39, 52, 1, 25, 40, 27–29, 44; 707/3, 4–6, 9, 318, 513; 700/25, 87, 17

(56) References Cited

U.S. PATENT DOCUMENTS

| 4,718,107 | A | | 1/1988 | Hayes ............................ 455/4 |
| 5,195,135 | A | | 3/1993 | Palmer ........................ 380/20 |
| 5,485,518 | A | | 1/1996 | Hunter et al. ................. 380/20 |
| 5,550,575 | A | | 8/1996 | West et al. .................... 348/5.5 |
| 5,583,576 | A | | 12/1996 | Perlman et al. ............... 348/460 |
| 5,585,865 | A | | 12/1996 | Amano et al. ............... 348/731 |
| 5,751,335 | A | | 5/1998 | Shintani ...................... 348/5.5 |
| 5,778,135 | A | | 7/1998 | Ottesen et al. ................ 386/52 |
| 5,793,409 | A | | 8/1998 | Tetsumura ..................... 348/1 |
| 5,828,402 | A | | 10/1998 | Collings ...................... 348/5.5 |
| 5,828,419 | A | | 10/1998 | Bruette et al. ............... 348/563 |
| 5,878,233 | A | | 3/1999 | Schloss .................. 395/200.55 |
| 5,969,748 | A | | 10/1999 | Casement et al. .............. 348/7 |
| 5,973,683 | A | * | 10/1999 | Cragun et al. ............... 709/217 |
| 6,226,793 | B1 | * | 5/2001 | Kwoh .......................... 725/28 |
| 6,260,192 | B1 | * | 7/2001 | Rosin et al. ................... 725/39 |
| 6,266,664 | B1 | * | 7/2001 | Russell-Falla et al. ...... 709/218 |
| 6,389,436 | B1 | * | 5/2002 | Chakrabarti et al. ........ 707/513 |
| 6,400,996 | B1 | * | 6/2002 | Hoffberg et al. .............. 700/83 |

FOREIGN PATENT DOCUMENTS

WO          WO 99/44361        9/1999          ............ H04N/7/10

* cited by examiner

Primary Examiner—Wen-Jan Lin
(74) Attorney, Agent, or Firm—Scott Charles Richardson; Kevin E. West; Suiter - West

(57) ABSTRACT

A method of setting acceptable content rating parameters for filtering content in a ratings-enabled media wherein the acceptable content rating parameters delimit the threshold content ratings levels of content that may be accessed by an information appliance is provided. Employing the present method, a user may set the acceptable content rating parameters of a content control system by blocking or unblocking example content provided by the information appliance, in order to control future access to content similar to the example content. In this manner, specific knowledge of the content ratings scheme employed, or the meaning of specific content ratings used by such a scheme is not required.

32 Claims, 7 Drawing Sheets

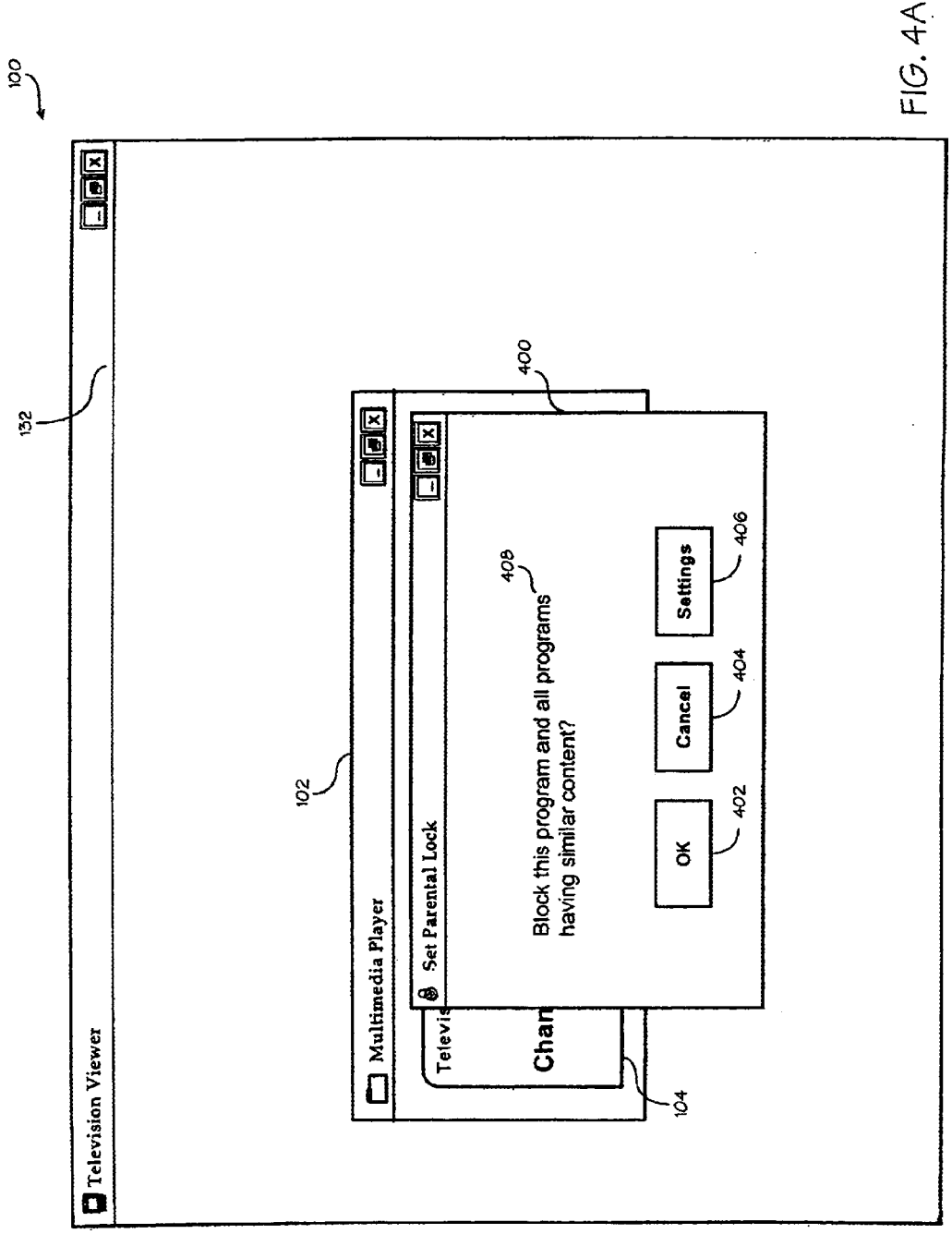

METHOD OF SETTING PARENTAL LOCK LEVELS BASED ON EXAMPLE CONTENT

FIELD OF THE INVENTION

The present invention relates generally to content control systems for limiting access by children to certain types of content. More specifically, the present invention relates to a method of setting the content rating parameters of such a system based on content rating of example content.

BACKGROUND OF THE INVENTION

The exposure of children to inappropriate material, such as sexual content, violence, coarse language, and so forth, in media such as television, radio, and the Internet has become a great concern. Recent technological developments allow greater parental control of material to which children are exposed. For example, many televisions now include devices that decode program rating data encoded into a program at the time it is broadcast to selectively pass or block television programming based on the rating level set. Similarly, software programs have been developed that block access to Internet material containing content that may be deemed inappropriate for young children.

Such content control technologies potentially eliminate the need for content censorship, thus providing greater freedom of expression for broadcasters, Web page authors, and the like, while providing an opportunity for parents to control, even in their absence, children's access to media content according to their own values and child-rearing philosophy. However, because existing content control systems place the responsibility of protecting children from viewing inappropriate material with parents, even the most fail-safe of parental control technologies will be of little value if parents are unable or unwilling to exercise this responsibility.

A major reason parents fail to effectively use existing content control systems to block objectionable content is the confusing nature and variety of ratings utilized by existing ratings schemes. For example, television broadcasts may use MPAA (Motion Picture Association of America) rating schemes having ratings such as G, PG, PG-13, R, and/or broadcast television rating (TV rating) schemes having ratings such as TV-Y, TV-Y7, TV-Y7-FV, TV-G, TV-PG, TV-14, TV-MA. In some TV rating schemes, a "fantasy violence" (FV) indicator may be added to the TV-Y rating, and indicators for violence (V), sexual situations (S), language (L), and dialog (D), may be added to each of the TV-PG, TV-14, and TV-MA ratings. Similarly, DVD rating systems may employ a numbered rating system, for example, a scale from 1–10, with associated MPAA ratings. Internet blocking software, while not yet utilizing an established rating system, nevertheless classify Internet material by content themes such as course language, inappropriate sexual content, violence, or the like. Parents may be confused by this myriad of rating systems and may not fully understand what ratings of such systems represent or how they are applied to the content. Further, the type of content encompassed by the ratings of such ratings schemes is subject to change over time as societal values change. Thus, a rating given to existing content may in the future become inappropriate for that content. For instance, a television program employing a TV ratings scheme may be assigned a TV-G rating even though it contains a limited amount of mild violence. However, future events may dictate that exposure of children to violent content of any kind is undesirable, and should result in such content warranting a TV-PG rating. A parent wishing to block content containing any violence may thus block content having ratings equal to or exceeding TV-PG. If the television program is thereafter rebroadcast without adjustment of its rating, the parent may be surprised to find that the program is not blocked as expected because of its violent content, due to its original TV-G rating.

Because various media employ different rating schemes and different user interfaces, and because the meaning of ratings utilized in such schemes may change over time, user of parental locking systems may be confusing. In some instances, a user may believe that certain rating levels may prevent access to objectionable subject matter when in fact such objectionable subject matter is passed. As additional rating schemes become more commonplace, such as electronic program guide (EPG) or DSS ratings, digital television (DTV) ratings, Web page ratings, and the like, it is probable that use of content control systems to filter content will become more and more difficult because of the confusing nature of the various ratings schemes and the lack of knowledge of what ratings of such schemes represent.

Therefore, there exists a need for a content control system capable of allowing a user to set acceptable content rating parameters for filtering media content, wherein the user in not required to have specific knowledge of the content ratings schemes used by the media, or the meaning of content ratings within the ratings scheme.

SUMMARY OF THE INVENTION

Accordingly, the present invention provides a method of setting content rating parameters of a content control system. Employing the present method, a user may set acceptable content rating parameters based on the rating of example content by blocking or unblocking the example content. The content ratings system compares the content rating of the example content with existing acceptable content rating parameters and adjusts the content rating parameters accordingly. In this manner, specific knowledge of the content ratings scheme employed, or the meaning of specific content ratings used by the content ratings scheme, is not required.

In one embodiment, the method includes the steps of presenting example content having an associated content rating to a user and receiving user input to block or unblock future access to programs having a content rating similar to the example content. The content control system then compares the content rating of the example content to previously set acceptable content rating parameters and adjusts the content rating parameters of the system based on the comparison to block or unblock future access to the example content and content similar to the example content.

In embodiments of the invention, the method may be implemented as a program of instructions executable by one or more information appliances including but not limited to digital information appliances, information handling systems, televisions, DVD devices, VCR devices, and the like. The program of instructions when executed causes the information appliance to perform the steps of the method.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

A detailed description of the invention may be best understood when read in reference to the accompanying drawings wherein:

FIGS. 4A and 4B illustrate lock confirmation windows according to one embodiment of the present invention;

DETAILED DESCRIPTION OF THE INVENTION

Figure 1:
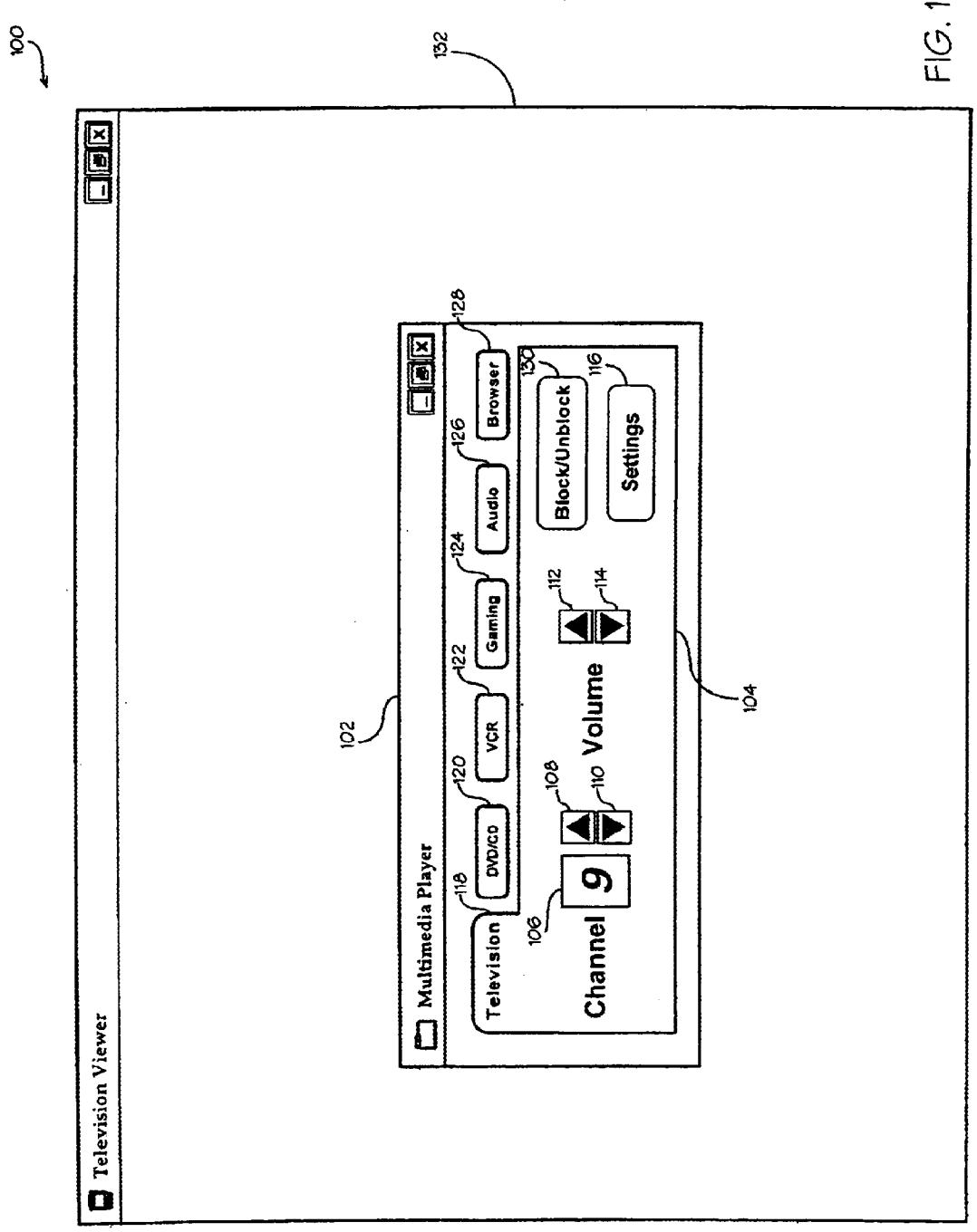
FIG. 1 shows the display screen of an exemplary information appliance, wherein the display screen provides an exemplary user interface suitable for implementing the present invention.

The present invention provides a method of setting acceptable content rating parameters of a content control system capable of filtering content of ratings enabled media. Employing the present method, a user may adjust the acceptable content rating parameters of the content control system by blocking or unblocking example content. When such example content is blocked or unblocked, the content control system compares the rating of the example content with existing content rating parameters and adjusts the content rating parameters based on the rating of the example content. In this manner, the user may set the desired level of filtering of content without having specific knowledge of the content ratings scheme employed by the media, or the meaning of specific content ratings used by the content ratings scheme. Instead, the user need only decide whether the example content is acceptable or unacceptable for the protected audience. When one of two different programs having the same content rating is blocked in one instance and the second program having the same content rating is unblocked in another instance, the content control system can be designed to err on the conservative side by accepting the more stringent level of content blocking. Or, in an alternative embodiment, the content control system can be designed to look for patterns in the blocked and unblocked programs having similar content ratings. Thus, a distinction may be drawn between similar content ratings such as TV-Y, wherein TV-Y-V is deemed acceptable for viewing by children, and TV-Y-S is deemed unacceptable.

Content rating parameters delimit the content ratings threshold of content accessible by protected audiences. Protected audiences include users of information appliances providing access to the ratings enabled media who are prevented from accessing inappropriate content by the content control system. Exemplary ratings enabled media may include, but are not limited to, broadcast television, cable television services, pay-per-view services, video on demand services, digital satellite television services, DVD, video cassette, laserdisc, radio, cable music services, compact discs (CD), audio cassette tape, the Internet, intranets, and the like.

In specific embodiments, acceptable content rating parameters are often more commonly referred to by those skilled in the art, especially when applied to television media, as "parental lock levels" or "parental locks." However, although exemplary embodiments of the invention will be described herein in terms of "parental control system," "parental lock levels" or "parental locks," it should be recognized that use of the word "parental" in such terms is intended to encompass any other person, in addition to parents who desire to prevent access of persons, and in particular children to inappropriate content. Such persons may include, but should not be limited to, administrators of computers or networks available to the public, such as in libraries, in church environments, on display in a retail environment, and so forth, or persons who display content where children may be present, such as in-flight movies displayed on an aircraft, and so forth.

Further, although the present invention will be described primarily in reference to television broadcast ratings (TV ratings) and MPAA motion picture ratings, it will be recognized that the present invention is not limited to the particular ratings systems described below. Other ratings include, for example, DVD ratings, electronic program guide (EPG) ratings such as Telstar, EchoStar, or other EPG systems, digital television (DTV) ratings, or any other ratings standards, as are now available or as may become available in the future. Reference will now be made in detail to presently preferred embodiments of the invention, examples of which are illustrated in the accompanying drawings.

Figure 2:
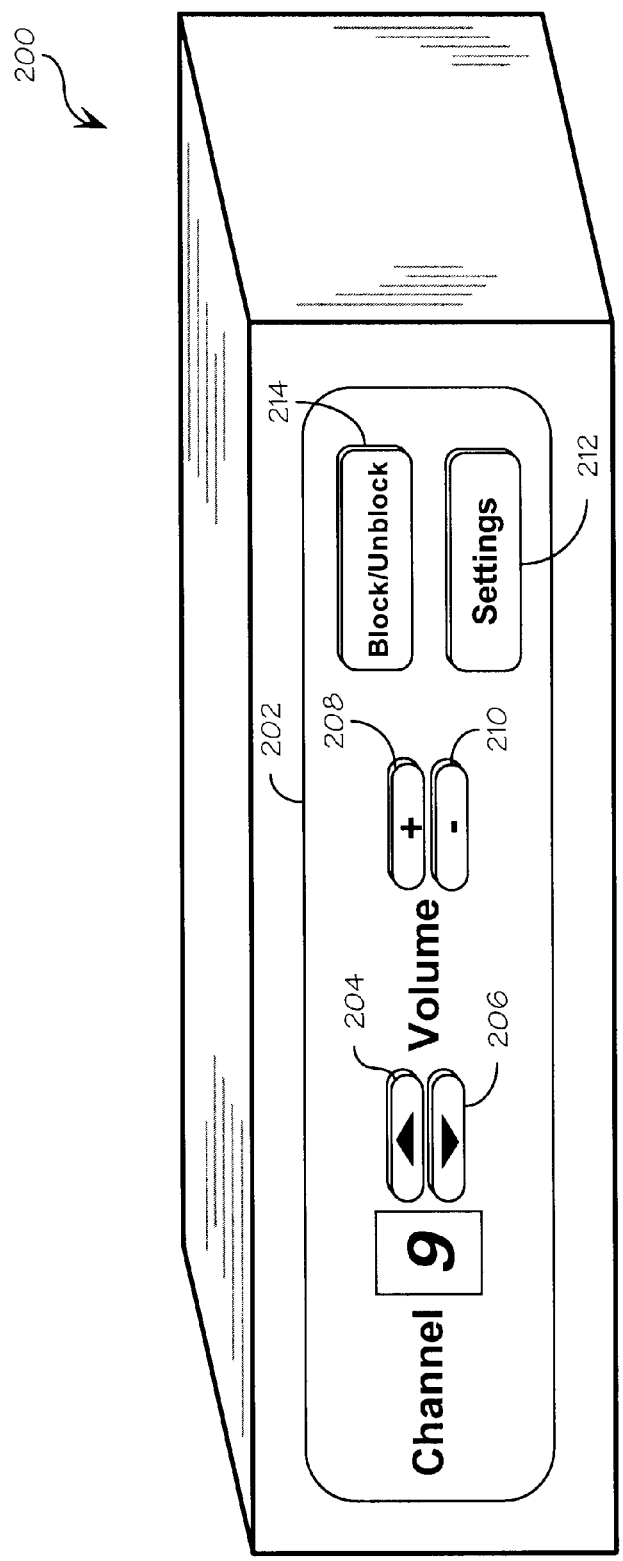
FIG. 2 is a perspective view of an information appliance wherein the present invention is implemented as a button or switch of a control panel disposed on the housing of an information appliance.

Referring now to FIGS. 1 and 2, exemplary user interfaces of information appliances implementing content control systems employing the present invention are described. As shown in FIG. 1, an exemplary user interface 100 is displayed to the user by a display device of the information appliance. In one embodiment, such a user interface 100 may include an on-screen control panel 102 for controlling access to media by the information appliance (see FIG. 6). A region or window 104 of the control panel 102 contains therein display fields such as "Channel" 106 and various control buttons or switches such as channel selection 108 & 110, volume 112 & 114, "Settings" 116 and so forth, which function as on-screen visual representations of controls of the information appliance or, alternately, peripheral devices attached thereto that provide access to one or more media.

Wherein multiple media may be accessed by the information appliance, the control panel may further provide controls for selecting a particular media to access. In the exemplary embodiment shown in FIG. 1, these controls comprise a series of buttons 118, 120, 122, 124, 126 & 128, which, when selected, change the contents of region or window 104 so that the controls provided therein are suitable for controlling functions of the information appliance and/or peripheral devices used to access the media. Highlighting, color differentiation, or other visual indicia may be provided to show the media selected. It will be recognized that other means for selecting between and controlling provision of media accessed by the information appliance may be provided, including, but not limited to, menu hierarchies, pull down menus, pop-up lists, radio button or check box lists, and so forth.

In accordance with the present invention, the user interface 100 further provides a control for providing an option to block or unblock the example content provided by the information appliance. For instance, as shown in FIG. 1, such a control is implemented in the region or window 104 as a button 130 labeled "Block/Unblock". A user, wishing to block or unblock example content, selects the "Block/Unblock" button 130 to initiate adjustment of the acceptable content rating parameters by the content control system as described more fully herein below.

As used herein, any on-screen graphical object which is described as a button or otherwise said to be selectable or otherwise accessed is intended to refer to on-screen objects which may advantageously be controlled with a pointing device such as a mouse or other device for controlling an on-screen pointer or cursor and generating mouse button events, although it will be recognized that many of such objects may also be made accessible through input via a keyboard, keypad, remote control device, or like input device as well.

The present invention may alternately be implemented physically as a control disposed on the housing of the information appliance providing the content control system. For instance, as shown in FIG. 2, an exemplary information appliance 200, in this case peripheral device or "set-top box", includes a control panel 202 providing a user interface for controlling access of media provided to users of the appliance 200. The control panel 202 includes various control buttons or switches such as channel selection buttons 204 & 206, volume buttons 208 & 210, "Settings" button 212, and so forth, which control functions of the information appliance 200 and features of the media accessed thereby. In accordance with the present invention, the control panel 202 further includes a control button 214 ("Block/Unblock") providing an option to block or unblock example content provided by the information appliance 200. A user, wishing to block or unblock example content, depresses the "Block/Unblock" button 214 to initiate adjustment of the acceptable content rating parameters by the content control system as described more fully below.

It will be recognized that user interfaces implementing the present invention are not limited to any particular design or layout, and that the control panels 104 & 202 of FIGS. 1 and 2 are provided merely to illustrate exemplary methods of providing convenient user access to content control systems implementing the present invention. Thus, any other method of accessing the content control system to adjust the system's acceptable rating parameters may be provided, including methods wherein access is provided via other software applications or the information appliance's operating system environment. For example, other control panel or media player software interfaces may be adapted to provide access to the generally applicable parental lock control in accordance with the present invention. Also, the present invention may also be implemented as a stand alone parental lock software application, utility, or control panel.

Figure 3:
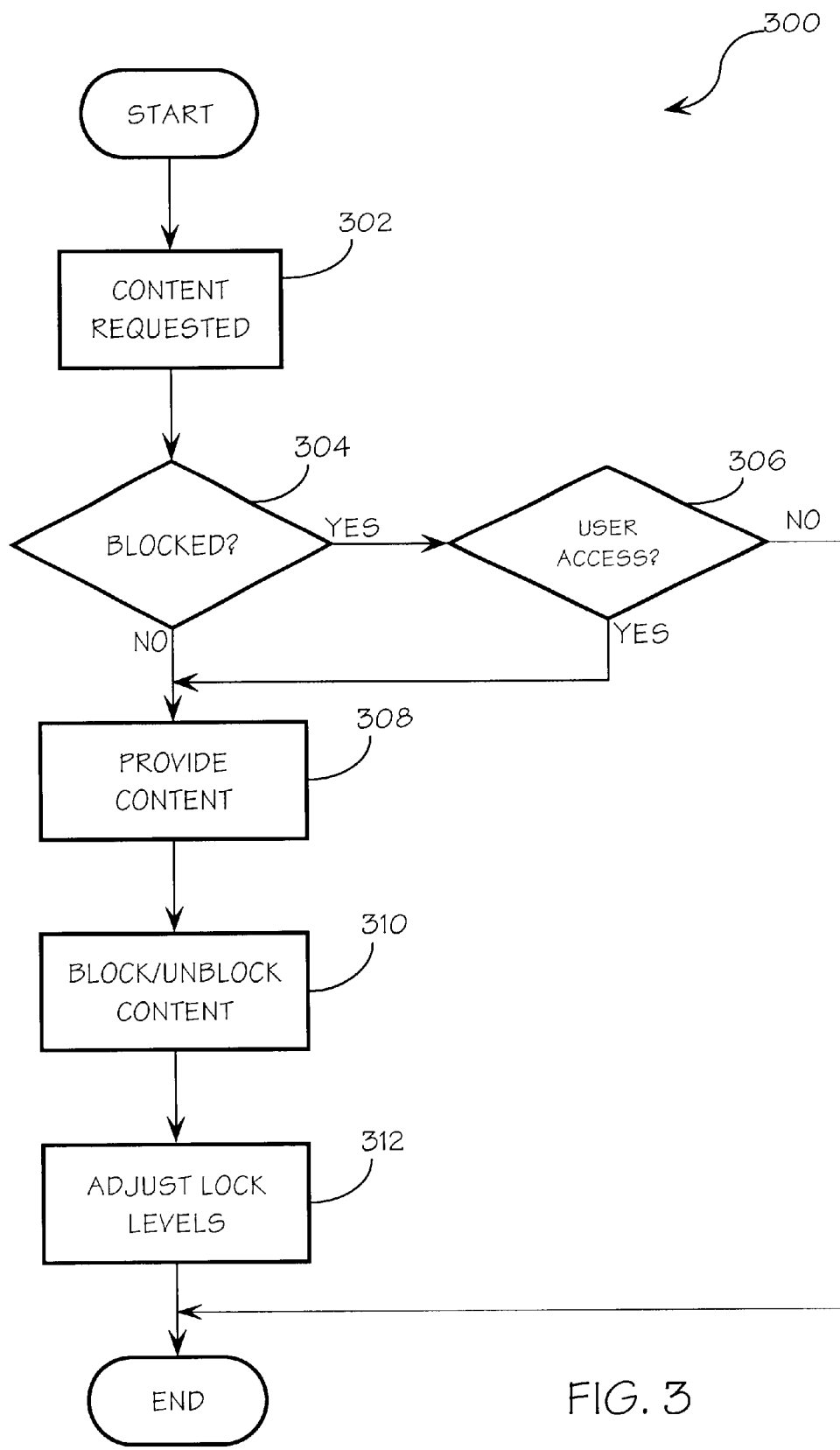
FIG. 3 is a flow diagram illustrating a method of setting acceptable content rating parameters based on example content in accordance with an exemplary embodiment of the present invention.

Referring now to FIG. 3, a method for adjusting the acceptable content rating parameters of a content control system in accordance with an exemplary embodiment of the present invention is shown. The method 300 is initiated when a user requests content [hereinafter "example content"] from a ratings enabled media at step 302. The example content may have associated therewith a content rating describing the nature of the content and its appropriateness for a particular audience such as young children. For instance, employing the user interface shown in FIG. 1, a user may choose to view a television program by accessing the control panel 102 and selecting the button 118 corresponding to a television viewing application thereby displaying controls for the application in region 104. The user may then select a channel displaying the desired television program using channel selection buttons 108 & 110. The selected television program may have an associated content rating such as a TV parental guidelines rating or an MPAA rating.

The content control system, upon receiving the user request, determines if the example content is blocked at step 304, for instance, because its content rating exceeds the rating threshold delineated by previously set acceptable content rating parameters of the content control system. For example, wherein the user has chosen to view a television program, that program's MPAA or TV rating may exceed a previously set parental lock level. Thus, wherein the television program has an associated TV rating of TV-PG and the parental lock level is set so that all television programs having TV ratings equaling or exceeding TV-PG (i.e., TV-PG, TV-14, and TV-MA ratings) are blocked, an example television program having a TV-PG, TV-14, or TV-MA rating would be blocked while a television program having a TV-Y, TV-Y7 or TV-G rating would not.

If the example content is blocked, the content control system may allow access to the example content at step 306 by authorized users. In exemplary embodiments, such an authorized user may enter an access code, password or the like to access the blocked content. Thus, in the forgoing example, where the example television program is blocked, an authorized user, such as a parent, may view the program by entering his or her password. However, unauthorized viewers, such as children, who do not possess the necessary password could not.

Features designed to prevent tampering with the content control system to gain unauthorized access to content may also be included. For example, if incorrect passwords are entered a predetermined number of times, the system may be instructed to disable access to the media, preferably via a user selectable parameter. As an alternative, or addition, to barring all access to the media, attempts to breach the system may be reported to authorized users such as parents in the form of a data file, pop up message, and so forth.

Initially, the acceptable content rating parameters may be set either manually or through previous use of the present invention. For example, during initial use of the information appliance the acceptable content rating parameters may be set so that all content is passed, that is, no content provided by the appliance is blocked. The first time the user blocks example content, the acceptable content rating parameters of the content control system would be set to the content rating of the example content. As the user thereafter accesses additional example content, he or she may selectively block and unblock the content based on its subject matter adjusting the acceptable content rating parameters of the system. In this manner the acceptable content rating parameters could be adjusted or "fine tuned" to provide the desired level of filtering in a relatively short period. Alternately, the acceptable content rating parameters may be set by entering the acceptable content rating parameters of the content control system manually. A parental control system allowing such manual entry is described in commonly owned U.S. patent application Ser. No. 09/375,692 filed Aug. 17, 1999 by Gary E. Sullivan et al., which is herein incorporated by reference in its entirety.

Again referring to FIG. 3, if the example content is not blocked at step 304, or, alternately, the user accesses the example content, for instance, by entering an access code or password at step 306, the content control system allows the information appliance to provide the example content to the user at step 308. The user, upon examining the example content provided at step 308, may then decide to block content similar to the example content if it were unblocked or unblock the content similar to the example content if it was inappropriately blocked. Consequently, the user may command the content control system to block or unblock content similar to the example media at step 310.

For example, in FIGS. 1 and 2, the user may select (or depress) the "Block/Unblock" buttons 130 & 214 provided by user interfaces 100 & 200. To prevent tampering with the content control system by members of the protected audience, exemplary embodiments may allow only authorized persons, for instance parents, library administrators, teachers, or the like to block and/or unblock content. For example, an authorized user may be required to enter an access code, password or the like to unblock blocked content.

Preferably, the user commands the content control system to block or unblock the example content at any time during or after accessing (e.g., viewing or listening to) the content, provided additional example content has not been requested. However, in a more flexible embodiment, the content control system may store the identification and content rating of example content provided to the user. In this manner, the user may thereafter choose to block or unblock that content, for instance, after viewing additional content, or before turning off the information appliance providing the content by recalling the identification of the example content from the memory whereupon the content control system may be commanded to block or unblock content similar to the example content. Similarly, in one embodiment, the present invention may allow the user to block or unblock example content without first viewing the content. For example, the user may have prior knowledge of the example content and may wish to adjust the acceptable content rating parameters so content similar to the example content is blocked or unblocked without again viewing the content.

If the user chooses to block or unblock content similar to the example content at step 310, the acceptable content rating parameters are adjusted, at step 312, based on the content rating of the example content. The content control system compares the content rating of the example content to the existing acceptable content rating parameters and modifies the acceptable content rating parameters based on the comparison. The acceptable content rating parameters may then be used to provide a content rating threshold for blocking future access to the example content and any content having ratings similar to the example content.

In further examples of the present invention, the content control system may utilize multiple acceptable content rating parameters providing content rating thresholds for media using different rating schemes. When a user views example content in a first media using a first rating scheme and blocks or unblocks the example content causing the system to adjust the acceptable content rating parameter for that media, the acceptable content ratings parameters for media using other ratings schemes may also be adjusted accordingly. This adjustment may be accomplished, in one embodiment, by equating ratings of the various rating schemes utilized by the media. For instance, wherein the media is television employing both the TV parental guideline and MPAA ratings schemes, a TV rating of TV-G may be equated to an MPAA rating of G, a TV rating of TV-PG may be equated to an MPAA rating of PG, and so forth. However, it will be appreciated that the ratings used by one ratings scheme may not necessarily correspond one for one with the ratings used by a second ratings scheme. In such cases, a given rating in one scheme may usually be equated to a more restrictive rating in a second scheme. Thus, in the proceeding example, a TV-rating of TV-14 may be equated to the slightly more restrictive MPAA rating of PG-13, while a TV-rating of TV-MA may be equated to the more restrictive MPAA rating of R. Thus, wherein an information appliance is capable of accessing multiple media, for example, television, DVD movies, VCR movies, the Internet, and the like, a user may adjust the acceptable content rating parameters for each media based on example content of any one media even though each of the media may employ different ratings schemes.

Referring now to FIGS. 1, 4A, 4B and 5, an exemplary embodiment of the present invention is shown wherein the media is television. In such an embodiment, the information appliance may include a television tuner employing a content control system more commonly referred to in the art as a "parental control system" for filtering content provided by the information appliance. When a user such as a parent has requested a television program, and that program is not blocked by the parental control system, the information appliance is capable of displaying the television program within a television viewer region or window of the user interface. The parent, upon viewing the program, may decide that the program contains subject matter that is inappropriate for a protected audience, such as young children. For instance, the television program may contain graphic violence or sexual themes to which the parent does not want his or her children exposed.

Consequently, the parent may wish to block access to the television program and other television programs having similar content. As shown in FIG. 1, the parent selects the "Block/Unblock" button 130 provided in region 104 thereby commanding the parental control system to block the example television program. Alternately, if the parent has requested a television program, and that program is blocked by the parental control system, the parent may enter a password to override the block and view the program. The information appliance may then display the television program within the television viewer region or window 132 of the user interface 100. If the parent thereafter determines that the television program was inappropriately blocked, depressing the "Block/Unblock" button 130 will unblock the television program and all similar programs. Again, as discussed more fully above, in exemplary embodiments, the parent may select the "Block/Unblock" button 130 at any time after selecting the television program; i.e., prior to or instead of viewing the program, while viewing of the program, or after viewing the program.

When the parent selects the "Block/Unblock" button 130, the information appliance compares the existing acceptable content rating parameters to the rating of the television program and adjusts them accordingly. For example, wherein the television parental control system utilizes the standard TV parental guideline rating scheme, the acceptable content rating level, more commonly referred to as the "parental lock level" may be set at TV-14. The parent viewing a television program having a TV-PG rating may decide that the content of the television program is not acceptable for viewing by audiences including younger children. The information appliance, upon receiving user input to block or unblock the television program via selection of the "Block/Unblock button 130, compares the existing parental lock level (TV-14) with the rating of the example program (TV-PG). Since the existing parental lock level is less restrictive than the rating of the example program (TV-PG), the information appliance adjusts the parental lock level to equal the content rating of the television program. In this case, the parental lock level is adjusted from TV-14 to TV-PG. Thereafter, all television programs having content ratings equal to or exceeding TV-PG would be blocked by the parental control system.

Similarly, a parent viewing a blocked television program, for example, a television program having a TV-G rating wherein the parental lock level is set at TV-Y, may find that the program is not objectionable and is therefore inappropriately blocked. The parent may unblock the television program by selecting the "Block/Unblock" button 130 whereupon the information appliance compares the existing parental lock level (TV-Y) with the rating of the example program (TV-G). Since the existing parental lock level is more restrictive than the rating of the television program (TV-G), the information appliance adjusts the parental lock level to equal the rating of the television program, that is the parental lock level is adjusted from TV-Y to TV-PG. Thus, only television programs having content ratings equal to or exceeding TV-PG would be blocked by the parental control system, whereas programs with TV-G, now deemed acceptable, would no longer be blocked.

Figure 4B:
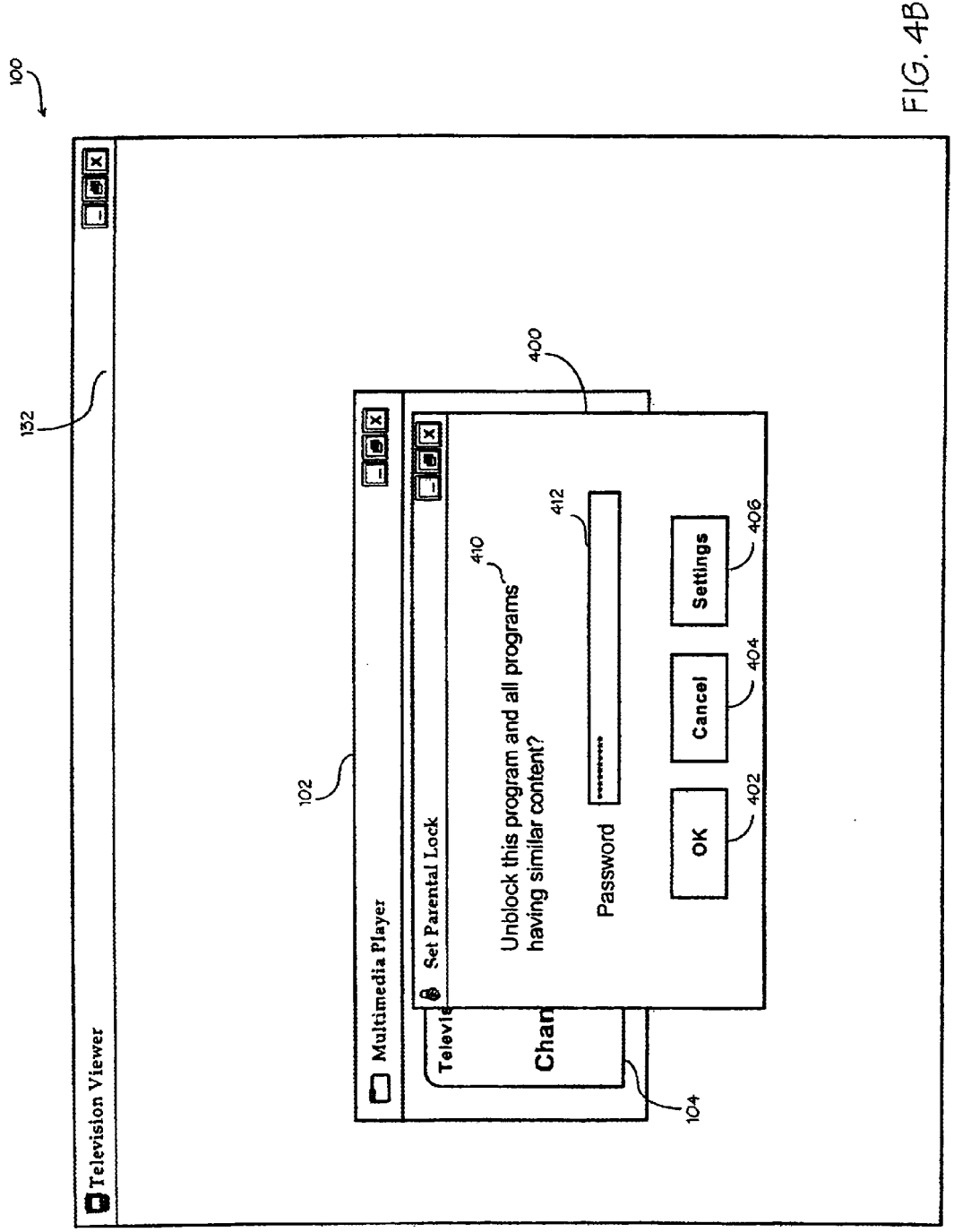

In exemplary embodiments of the invention, when the user selects the "Block/Unblock" button 130, a request for confirmation of the selection may be provided to the user before adjusting the acceptable parental lock levels of the parental control system. Thus, as shown in FIGS. 4A and 4B, the information appliance may display a parental lock confirmation region or window over the television viewing window for requesting confirmation that the user wishes to block or unblock television programs similar to the program being viewed. The confirmation window 400 may include a button ("OK") 402, which when depressed, confirms the original selection of the "Block/Unblock" button 130 (FIG. 1). Likewise, a second button ("Cancel") 404 may be provided allowing the user to cancel his or her selection of the "Block/Unblock" button 130 and return to the television viewing window 132 without adjusting the parental lock levels. Additionally, a button ("Settings") 406 may be provided for allowing the user to access the content control system settings, to, for example, view the existing acceptable content rating parameters.

If the television program was unblocked, selection of the "Block/Unblock" button 130 (FIG. 1) will adjust the parental control system's parental lock levels so as to block the television program and television programs having similar content. Thus, as shown in FIG. 4A, the confirmation window 400 displays a request ("Block this program and all programs having similar content?") 408 that the user confirm that he or she wishes the example program and all programs having similar content to be blocked in the future. Alternately, if the user determines that the example program was inappropriately blocked, depressing the "Block/Unblock" button 130 (FIG. 1) will unblock the example program and all similar programs. Thus, as shown in FIG. 4B, the confirmation window 400 would provide a request ("Unblock this program and all programs having similar content?") 410 asking the user to confirm that the example program and allow programs having similar content are to be unblocked. The confirmation window 400 may further include a field 412 requiring the user to enter a password to prevent tampering with the parental control system by members of the protected audience.

In an exemplary embodiment of the invention, multiple user profiles may be created and stored for individual users or groups of users. Each user profile may have individual acceptable content rating parameters set specifically for that user or group of users. Thus, a young child may have more restrictive acceptable content rating parameters than would a teen-aged child, who may, in turn, have more restrictive acceptable content rating parameters than would an adult. Likewise, a user group consisting of children may have more restrictive acceptable content rating parameters than a user group consisting of parents.

An authorized user, such as a parent, may generate user profiles by entering a user identification for each user via the user interface and thereafter adjusting the acceptable content rating parameters for that user base on example content. Each user would thereafter enter his or her user identification via the user interface to access content via the information appliance. Alternately, in one embodiment, personal remote control devices for specific users may be provided and associated with a specific user profile stored in the system. In this manner, the system can identify the remote control device used, determine the user associated with the identified remote control device, and apply the parental locks to each device according to the user profile associated with the remote control device.

Figure 5:
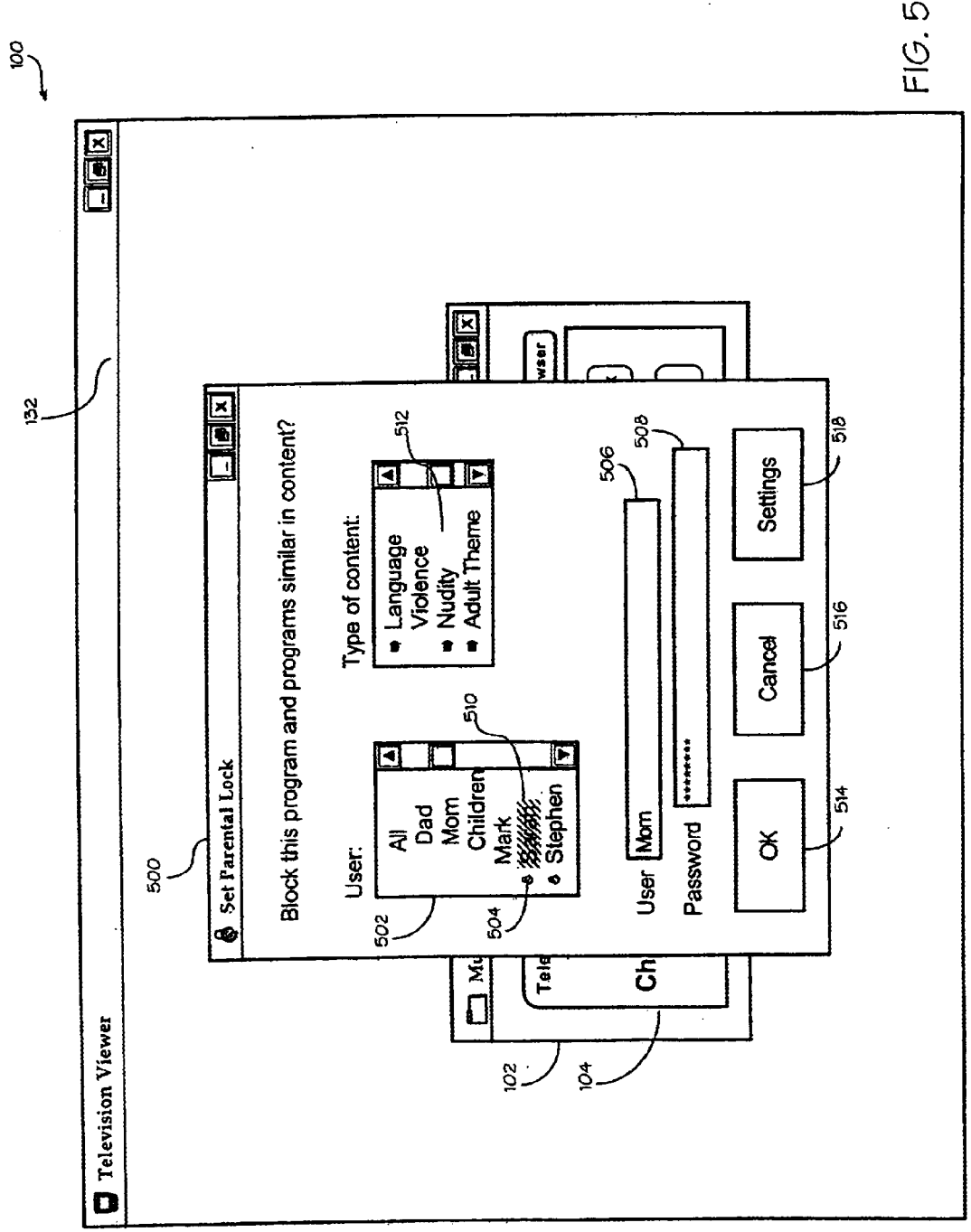
FIG. 5 illustrates a lock confirmation window according to an embodiment of the present invention accommodating multiple user profiles.

An exemplary confirmation region or window for a multiple user profile embodiment is shown in FIG. 5. When an authorized user, such as a parent ("Mom") selects the "Block/Unblock" button 130 (see FIG. 1), the confirmation window 500 is displayed by the information appliance, for example, over the television viewing window 132. The confirmation window 500 allows the authorized user to adjust the parental lock levels of the parental control system for each user or group of users. For instance, in the embodiment shown in FIG. 5, a field 502 may be provided allowing the authorized user ("Mom") to select users (e.g., "Dad", "Mom", "Mark", "Sarah", "Stephen") and/or groups of users (e.g., "All", "Children") for which for which television programs similar to the television program currently being viewed are to be blocked in the future. The parental lock levels for that user or group of users are then adjusted in accordance with the present invention by comparing the rating of the television program with the existing parental lock levels for that user or group of users and adjusting the parental lock levels accordingly. The confirmation screen 500 may also provide a way of indicating which users or user groups have been selected for adjustment. For instance, in the embodiment shown in FIG. 5, indicia 504, in this case a representation of a lock, are displayed adjacent to the user's or group's name to indicate that that user has been selected for blocking of programs similar to the example television program. The confirmation window 500 may further include fields 506 & 508 requiring the user to enter a user identification, for example, a user name and password to verify that the user making the changes is authorized to do so.

In a further exemplary embodiment, the acceptable content rating parameters may also be set according to content theme, wherein the ratings scheme allows content of the media to be distinguished according to content theme. Thus, a user viewing content such as a television program may determine that specific content themes presented by the program, such as for example, nudity and sexual content, are objectionable. As a result, the user may wish to block the example program and other programs having content themes similar to the objectionable themes in the example program. For example, wherein the media is television, each television program may utilize TV Parental Guideline rating scheme ratings (TV-Y, TV-Y7, TV-G, TV-PG, TV-14, TV-MA) that further include content theme indicators such as a "fantasy violence" (FV) indicator that may be added to the TV-Y rating, and indicators for violence (V), sexual situations (S), language (L), and dialog (D), may be added to each of the TV-PG, TV-14, and TV-MA ratings. The content control system, in this case a parental control system, may store these indicators as part of its parental lock levels to block specific television programs containing unacceptable themes. Thus, in one embodiment, the parental lock levels may be set to TV-PG-V, TV-14-L, and TV-G-S so that television programs having ratings equal to or exceeding TV-PG for violence, TV-14 for language, and/or TV-G for sexual situations are blocked.

As shown in FIG. 5, to adjust parental lock levels for a specific user or group of users, an authorized user such as a parent ("Mom") may first select a user profile, in this case a child identified as "Sarah" 510, and then select content of the example program that is objectionable for that user, i.e., "Language", "Nudity", "Adult Theme" from field 512. The parent may select content themes of the example program to be blocked or passed for each user profile to be adjusted. The parent may then select the "OK" button 514 whereupon the parental lock levels for the altered user profiles are adjusted accordingly. In this manner, television programs having content theme ratings similar to the content theme ratings of the example television program for the content themes found to be objectionable are blocked. As an additional means of parental control, the parent may be given the option of completely blocking certain themes, such as violence, regardless of the content theme rating of a given program. This feature would override the block/unblock access determined via the selection of example content of the present invention. Alternately, the parent may select the "Cancel" button 516 to cancel his or her changes and return to the television window 132 without adjusting the parental lock levels. Additionally, a button ("Settings") 518 may be provided for allowing the user to access the content control system settings for each user profile, to, for example, view the existing parental lock levels.

The present invention may be adapted for further enhancements in what is sure to be an ever-increasing technology. As advancements in media technologies are made and as mass storage capabilities are increased, it is likely that a further proliferation of content control standards will occur. For example, rather than rating entire movies or programs, ratings of some materials, and thus the application of content rating parameters, may involve blocking of individual scenes rather than entire programs or movies. Likewise, as sufficiently large random access mass storage devices become available (or where transmission bandwidth would permit), content control devices may involve scene replacement technology. For example, a movie, which with the exception of certain scenes may otherwise may be acceptable for most viewers, may be stored (or broadcast) with alternative scenes containing different levels of violence, language, sex, acceptable for different age levels. As such, a content control system may provide the option of allowing playback with acceptably rated scenes substituted for the original scenes. The present invention may be adapted to such standards as they may occur by providing a means of easily adjusting the content ratings parameters for such content control systems.

Although the invention has been described with a certain degree of particularity, it should be recognized that elements thereof may be altered by persons skilled in the art without departing from the scope and spirit of the invention. It is understood that the specific orders or hierarchies of steps in the method as disclosed in FIG. 3 are examples of an exemplary approach. Based upon design preferences, it is understood that the specific order or hierarchy of the method can be rearranged while remaining within the scope of the present invention. The accompanying method claims present elements of the various steps in a sample order, and are not meant to be limited to the specific order or hierarchy presented.

Figure 6:
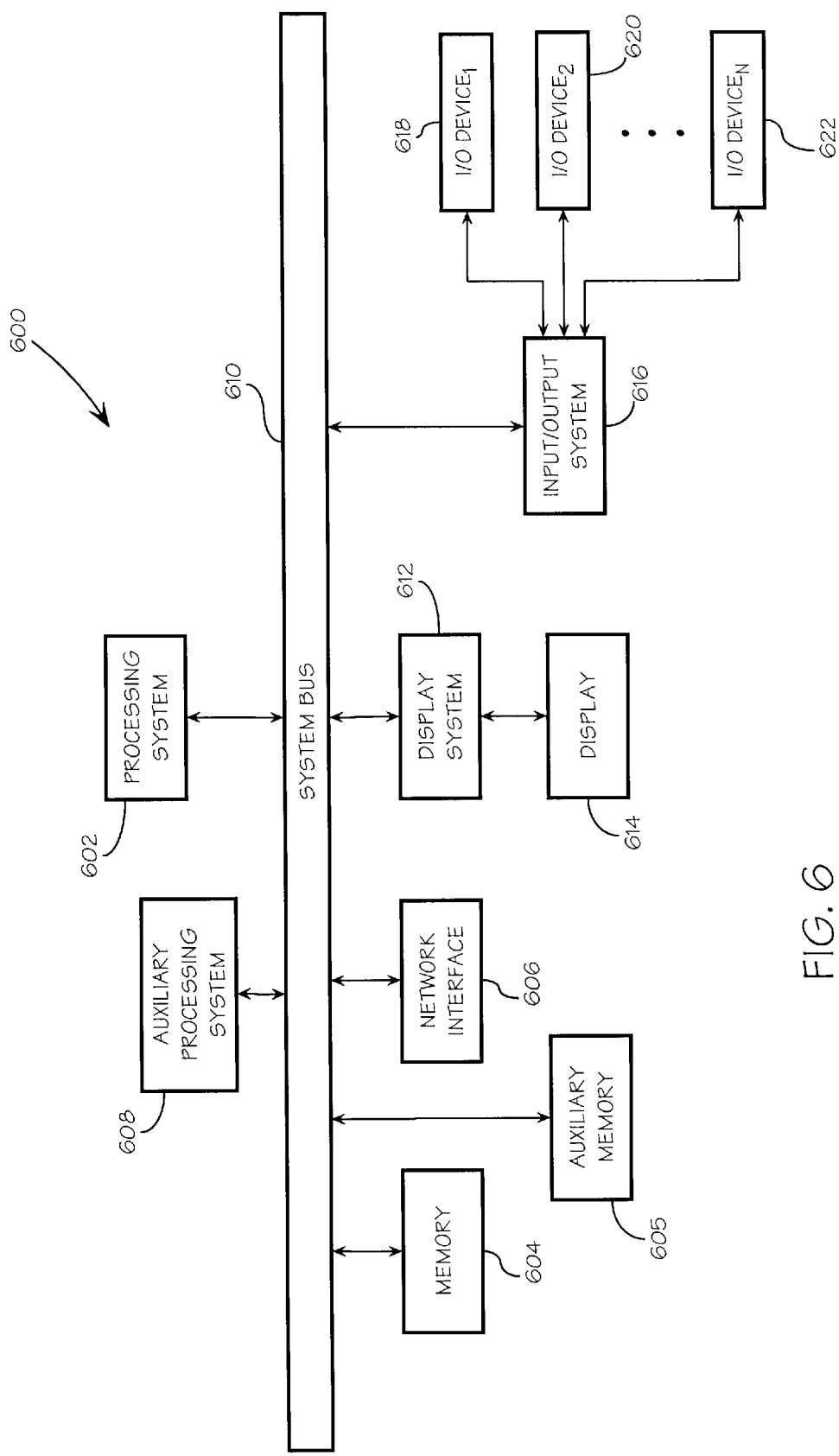
FIG. 6 is a block diagram illustrating the hardware architecture of an exemplary information handling system capable of implementing the present invention.

The present invention may be implemented as sets of instructions resident in memory of one or more information appliances configured generally as described in FIG. 6. For example, in an exemplary embodiment, the present invention may be implemented as an ancillary program of instructions or "plug in" for a parental control system application employed by the information appliance. Until required by the information appliance, the set of instructions may be stored in another readable memory device, for example in a hard disk drive or in a removable memory such as an optical disk for utilization in a CD-ROM drive, a floppy disk for utilization in a floppy disk drive, a floptical disk for utilization in a floptical drive, a personal computer memory card for utilization in a personal computer card slot, or the like. Further, the set of instructions can be stored in the memory of another information appliance and transmitted over a local area network or a wide area network, such as the Internet, an intranet, or the like, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

Referring now to FIG. 6, a hardware system in accordance with the present invention is shown. The hardware system 600 shown in FIG. 6 is generally representative of the hardware architecture of an information appliance suitable for implementing the present invention. In one embodiment, the hardware system 600 may comprise a convergence system, PC/TV system or the like, so named because such systems represent the convergence of computer and consumer electronics into a single system. Alternately, the hardware system, or portions thereof, may be part of an information appliance providing a specific media. Examples of such appliances include televisions, VCR devices, DVD devices, Web TV devices, satellite receivers, cable boxes and the like.

The hardware system 600 is controlled by a central processing system 602. The central processing system 602 includes a central processing unit such as a microprocessor or microcontroller for executing programs, performing data manipulations and controlling the tasks of the hardware system 600. Communication with the central processor 602 is implemented through a system bus 610 for transferring information among the components of the hardware system 600. The bus 610 may include a data channel for facilitating information transfer between storage and other peripheral components of the hardware system. The bus 610 further provides the set of signals required for communication with the central processing system 602 including a data bus, address bus, and control bus. The bus 610 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of the hardware system 600 include main memory 604, and auxiliary memory 605. The hardware system 600 may further include an auxiliary processing system 608 as required. The main memory 604 provides storage of instructions and data for programs executing on the central processing system 602. The main memory 604 is typically semiconductor-based memory such as dynamic random access memory (DRAM) and/or static random access memory (SRAM). Other semi-conductor-based memory types include, for example, synchronous dynamic random access memory (SDRAM), Rambus dynamic random access memory (RDRAM), ferroelectric random access memory (FRAM), and so on. The auxiliary memory 605 provides storage of instructions and data that are loaded into the main memory 604 before execution. The auxiliary memory 605 may include semiconductor based memory such as read-only memory (ROM), programmable read-only memory (PROM), erasable programmable read-only memory (EPROM), electrically erasable read-only memory (EEPROM), or flash memory (block oriented memory similar to EEPROM). The auxiliary memory 605 may also include a variety of non-semiconductor-based memories, including but not limited to magnetic tape, drum, floppy disk, hard disk, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), etc. Other varieties of memory devices are contemplated as well. The hardware system 600 may optionally include an auxiliary processing system 608 which may be an auxiliary processor to manage input/output, an auxiliary processor to perform floating point mathematical operations, a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor. It will be recognized that such auxiliary processors may be discrete processors or may be built in to the main processor.

The hardware system 600 further includes a display system 612 for connecting to a display device 614, and an input/output (I/O) system 616 for connecting to one or more I/O devices 618, 620, and up to N number of I/O devices 622. The display system 612 may comprise a video display adapter having all of the components for driving the display device, including video memory, buffer, and graphics engine as desired. Video memory may be, for example, video random access memory (VRAM), synchronous graphics random access memory (SGRAM), windows random access memory (WRAM), and the like. The display device 614 may comprise a cathode ray-tube (CRT) type display such as a monitor or television, or may comprise an alternative type of display technology such as a projection-type display, liquid-crystal display (LCD), light-emitting diode (LED) display, gas or plasma display, electroluminescent display, vacuum fluorescent display, cathodoluminescent (field emission) display, plasma-addressed liquid crystal (PALC) display, high gain emissive display (HGED), and so forth. The input/output system 616 may comprise one or more controllers or adapters for providing interface functions between the one or more I/O devices 618–622. For example, the input/output system 616 may comprise a serial port, parallel port, universal serial bus (USB) port, IEEE 1394 serial bus port, infrared port, network adapter, printer adapter, radio-frequency (RF) communications adapter, universal asynchronous receiver-transmitter (UART) port, etc., for interfacing between corresponding I/O devices such as a keyboard, mouse, trackball, touchpad, joystick, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electroacoustic transducer, microphone, speaker, audio amplifier, etc. The input/output system 616 and I/O devices 618–622 may provide or receive analog or digital signals for communication between the hardware system 600 of the present invention and external devices, networks, or information sources. The input/output system 616 and I/O devices 618–622 preferably implement industry promulgated architecture standards, including Ethernet IEEE 802 standards (e.g., IEEE 802.3 for broadband and baseband networks, IEEE 802.3 z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of the hardware system 600 of FIG. 6 by one having ordinary skill in the art would not depart from the scope or the spirit of the present invention.

The description above should not be construed as limiting the scope of the invention, but as merely providing illustrations to some of the presently preferred embodiments of this invention. In light of the above description and examples, various other modifications and variations will now become apparent to those skilled in the art without departing from the spirit and scope of the present invention as defined by the appended claims. Accordingly, the scope of the invention should be determined solely by the appended claims and their legal equivalents.

What is claimed is:

1. A method of setting acceptable content rating parameters of a content control system based on example content of a media, wherein the acceptable content rating parameters provide a threshold rating for filtering content of at least one media provided by an information appliance, comprising:

presenting example content to a user, the example content having an associated content rating;

receiving user input to block or unblock future access to content similar to the example content; and adjusting an acceptable content rating parameter of the content control system based on the content rating of the example content, wherein the information appliance compares the content rating of the example content to the acceptable content rating parameter and adjusts the acceptable content rating parameter based on the comparison so as to control future access to content similar to the example content.

2. The method of setting acceptable content rating parameters according to claim 1, further comprising allowing user input to unblock future access to content similar to the example content if the user has authority to unblock further access to such similar content.

3. The method of setting acceptable content rating parameters according to claim 2, wherein determining if the user has authority to unblock further access to content similar to the example content comprises receiving a user identification.

4. The method of setting acceptable content rating parameters according to claim 1, further comprising determining if the user has authority to block further access to content similar to the example content.

5. The method of setting acceptable content rating parameters according to claim 4, wherein determining if the user has authority to block further access to content similar to the example content comprises receiving a user identification.

6. The method of setting acceptable content rating parameters according to claim 1, wherein the acceptable content rating level comprises at least one user acceptable content rating level defining the content rating level acceptable for a particular user, further comprising adjusting the user acceptable content rating level for a particular user.

7. The method of setting acceptable content rating parameters according to claim 1, wherein the content rating is comprised of at least one content theme rating.

8. The method of setting acceptable content rating parameters according to claim 1, wherein the media comprises television and the content comprises television programs.

9. The method of setting acceptable content rating parameters according to claim 1, wherein the media comprises computer gaming and the content comprises computer games.

10. The method of setting acceptable content rating parameters according to claim 1, wherein the media comprises a network and the content comprises sites within the network.

11. The method of setting acceptable content rating parameters according to claim 1, wherein the media comprises music and the content comprises at least one of a song and a compilation of songs.

12. A program of instructions storable on a medium readable by an information appliance for causing the information appliance to execute steps for setting acceptable content rating parameters for filtering content in a ratings enabled media based on example content provided by the information appliance, the steps comprising:
   presenting example content to a user;
   receiving user input to block or unblock future access to content similar to the example content;
   comparing the content rating of the example content to a corresponding acceptable content rating parameter, the acceptable content rating parameter being suitable for delimiting a threshold content rating of content that may be accessed via the information appliance; and
   if the content rating of the example content differs from the acceptable content rating parameter, adjusting the acceptable content rating parameter to control future access to content similar to the example content.

13. The program of instructions for setting acceptable content rating parameters according to claim 12, further comprising determining if the user has authority to unblock access to content similar to the example content.

14. The program of instructions for setting acceptable content rating parameters according to claim 13, wherein determining if the user has authority to unblock further access to content similar to the example content comprises receiving a user identification.

15. The program of instructions for setting acceptable content rating parameters according to claim 12, further comprising determining if the user has authority to block access to content similar to the example content.

16. The program of instructions for setting acceptable content rating parameters according to claim 15, wherein determining if the user has authority to block further access to content similar to the example content comprises receiving a user identification.

17. The program of instructions for setting acceptable content rating parameters according to claim 12, wherein the acceptable content rating parameter comprises at least one user acceptable content rating parameter defining a threshold content rating level acceptable for a particular user, further comprising adjusting the user acceptable content rating parameter for a particular user.

18. The program of instructions for setting acceptable content rating parameters according to claim 12, wherein the content rating is comprised of at least one content theme rating.

19. The program of instructions for setting acceptable content rating parameters according to claim 12, wherein the media comprises television and the content comprises television programs.

20. The program of instructions for setting acceptable content rating parameters according to claim 12, wherein the media comprises computer gaming and the content comprises computer games.

21. The program of instructions for setting acceptable content rating parameters according to claim 12, wherein the media comprises a network and the content comprises sites within the network.

22. The program of instructions for setting acceptable content rating parameters according to claim 12, wherein the media comprises music and the content comprises at least one of a song and a compilation of songs.

23. An information appliance capable of setting acceptable content rating parameters for filtering content in a ratings-enabled media based on example content of the media, comprising:
   a processor for executing a program of instructions on the information appliance;
   at least one memory coupled to the processor for storing the program of instructions executable by the processor; and
   a user input device suitable for receiving user input to block or unblock communication of content similar to example content by the information appliance;
   the program of instructions being capable of configuring the information appliance for communicating the example content to a user, and upon receiving user input to block or unblock the example content, comparing the content rating of the example content with an acceptable content rating parameter and adjusting the acceptable content rating so as to control future access to content similar to the example content.

24. The information appliance according to claim 23, wherein the program of instructions further determines if the user has authority to unblock further access to content similar to the example content.

25. The information appliance according to claim 24, wherein the program of instructions requests entry of a user identification by the user.

26. The information appliance according to claim 23, wherein the acceptable content rating parameter comprises at least one user acceptable content rating parameter defining a threshold content rating level acceptable for a particular user, and wherein the program of instructions adjusts the user acceptable content rating parameter for a particular user.

27. The information appliance according to claim 23, wherein the content rating is comprised of at least one content theme rating.

28. The information appliance according to claim 23, further comprising a display for displaying the content.

29. The information appliance according to claim 23, wherein the media comprises television and the content comprises television programs.

30. The information appliance according to claim 23, wherein the media comprises computer gaming and the content comprises computer games.

31. The information appliance according to claim 23, wherein the media comprises a network and the content comprises sites within the network.

32. The information appliance according to claim 23, wherein the media comprises music and the content comprises at least one of a song and a compilation of songs.

* * * * *